(12) United States Patent
Jahns et al.

(10) Patent No.: US 11,674,048 B2
(45) Date of Patent: Jun. 13, 2023

(54) AQUEOUS POLYMER COMPOSITIONS FOR FLEXIBLE ROOF COATINGS

(71) Applicant: BASF SE, Ludwigshafen am Rhein (DE)

(72) Inventors: Ekkehard Jahns, Ludwigshafen (DE); Timo Mangel, Ludwigshafen (DE); Yeni Burk, Ludwigshafen (DE); Joachim Pakusch, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 461 days.

(21) Appl. No.: 16/643,079

(22) PCT Filed: Aug. 29, 2018

(86) PCT No.: PCT/EP2018/073167
§ 371 (c)(1),
(2) Date: Feb. 28, 2020

(87) PCT Pub. No.: WO2019/043024
PCT Pub. Date: Mar. 7, 2019

(65) Prior Publication Data
US 2020/0362149 A1    Nov. 19, 2020

(30) Foreign Application Priority Data
Aug. 30, 2017    (EP) ..................... 17188588

(51) Int. Cl.
| | | |
|---|---|---|
| C09D 133/08 | (2006.01) | |
| C08K 3/013 | (2018.01) | |
| C08F 220/18 | (2006.01) | |
| C08F 20/12 | (2006.01) | |
| C08K 3/30 | (2006.01) | |
| C08L 21/02 | (2006.01) | |
| C08L 25/06 | (2006.01) | |
| C08L 35/06 | (2006.01) | |
| C08L 71/02 | (2006.01) | |
| C08F 12/08 | (2006.01) | |

(52) U.S. Cl.
CPC ............ C09D 133/08 (2013.01); C08F 12/08 (2013.01); C08F 20/12 (2013.01); C08F 220/1804 (2020.02); C08K 3/013 (2018.01); C08K 3/30 (2013.01); C08L 21/02 (2013.01); C08L 25/06 (2013.01); C08L 35/06 (2013.01); C08L 71/02 (2013.01); C08K 2003/3045 (2013.01)

(58) Field of Classification Search
CPC ........ C09D 133/08; C08K 3/013; C08K 3/30; C08K 2003/3045; C08F 220/1804; C08F 12/08; C08L 21/02; C08L 25/06; C08L 35/06; C08L 71/02
USPC ....................................................... 524/560
See application file for complete search history.

(56) References Cited

U.S. PATENT DOCUMENTS

| | | |
|---|---|---|
| 6,242,515 B1 | 6/2001 | Zhao et al. |
| 2012/0077906 A1 | 3/2012 | Herold et al. |
| 2012/0121921 A1 | 5/2012 | Cosyns et al. |

(Continued)

FOREIGN PATENT DOCUMENTS

| | | |
|---|---|---|
| WO | 2012/038099 A1 | 3/2012 |
| WO | 2014/060456 A2 | 4/2014 |
| WO | 2014/075969 A1 | 5/2014 |

(Continued)

OTHER PUBLICATIONS

Fleischhaker et al. "Glass-Transition-, Melting-, and Decomposition Temperatures of Tailored Polyacrylates and Polymethacrylates: General Trends and Structure-Property Relationships", Macromol. Chem. Phys. 2014, 215, 1192-1200. (Year: 2014).*

(Continued)

*Primary Examiner* — Ling Siu Choi
*Assistant Examiner* — Ronald Grinsted
(74) *Attorney, Agent, or Firm* — Faegre Drinker Biddle & Reath LLP

(57) ABSTRACT

The present invention relates to the use of liquid aqueous polymer compositions containing an aqueous polymer latex and at least one inorganic particulate material for providing flexible roof coatings. The present invention also relates to a method for providing flexible roof coatings, which comprises applying said liquid aqueous polymer compositions to a flat roof. The liquid aqueous polymer composition contain, a. an aqueous polymer latex, where the polymer in the polymer latex is made of polymerized monomers M, where the polymerized ethylenically unsaturated monomers M comprise a combination of) at least two different monoethylenically unsaturated, non-ionic monomers M1, whose homopolymers have a theoretical glass transition temperature $T_g(th)$ of at least 25° C. and ii) at least two different monoethylenically unsaturated, non-ionic monomers M2, whose homopolymers have a theoretical glass transition temperature $T_g(th)$ of at less than 25° C., where each of the monomers M1 and M2 have a solubility in deionized water of at most 50 g/L and where the total amount of monomers M1 and M2 contributes with at least 90% by weight to the total amount of the monomers M, and b. at least one inorganic particulate material selected from inorganic pigments, inorganic fillers and mixtures thereof.

17 Claims, No Drawings

(56) References Cited

U.S. PATENT DOCUMENTS

2015/0307716 A1* 10/2015 Jahns ................. C09D 4/00
106/285
2017/0226377 A1    8/2017 Jahns et al.

FOREIGN PATENT DOCUMENTS

WO    WO-2014075969 A1 *  5/2014   ............ C08F 220/14
WO       2016/001256 A1    1/2016

OTHER PUBLICATIONS

Minex 10 Technical Datasheet by Sibelco Specialty Minerals, (http://www.coatings.specialchem.com) (Year: 2022).*

International Preliminary Reporton Patentability received for PCT Patent Application No. PCT/EP2018/073167, dated Oct. 12, 2019, 14 pages.

International Search Report and Written Opinion received for PCT Patent Application No. PCT/EP2018/073167, dated Nov. 9, 2018, 8 pages.

* cited by examiner

AQUEOUS POLYMER COMPOSITIONS FOR FLEXIBLE ROOF COATINGS

The present invention relates to the use of liquid aqueous polymer compositions containing an aqueous polymer latex and at least one inorganic particulate material for providing flexible roof coatings. The present invention also relates to a method for providing flexible roof coatings, which comprises applying said liquid aqueous polymer compositions to a flat roof.

Flat roofs, including entirely and nearly flat roofs, i.e. roofs having an inclination of not more than 15°, must be protected against adverse effects of weathering, more particularly against rain, dew, mist, snow or extreme temperatures. In particular water is problematic, as gravity and surface tension will pull it inside the smallest crack or crevice.

In former times, the protection of flat roofs was achieved by coatings on a bituminous basis, such as roofing felt. While these materials are cheap, their durability is not satisfactory. Moreover there are environmental concerns. While roofing with metals such as copper or zinc may be an alternative to bituminous materials, metal roofing is quite expensive. Recently, single ply roofing on the basis of sheets and panels of artificial rubber, such as EPDM (polymers based on ethylene, propylene and diene monomers) and TPO (polypropylene rubber and ethylene-co-polypropylene rubber), or thermoplastic polymers, such as PVC (polyvinyl chloride), has replaced roofing on bituminous basis. However, the use of sheets and panels bear the risk of mechanical damage in the course of transportation to the construction site, or during application on the construction site. Furthermore, the singly ply roofing requires a large number of panels or sheeting webs, which must be bonded adhesively in order to produce an assembly. These bonding sites, however, are a source of damage as a consequence of deficient bonding or aging, and this may lead to leaks and, ultimately, to failure of the roof coating.

More recently, liquid coating compositions for preparing flexible roof coatings came to the marked. These liquid coating compositions are applied, e.g. by rolling, brushing or spraying, as a liquid coating to a flat roof and provide upon curing a seamless flexible roofing membrane. This technique is also termed liquid roofing. Coating compositions for liquid roofing can be applied as a repair to an existing roofing but they may be also applied to an uncoated flat roof as a flexible roofing membrane. Most liquid roofing compositions are based on 2K polyurethane or epoxy systems. While 2K systems provide flexible roof coatings of high mechanical strength, their components must be mixed immediately prior to their application, which bears a certain risk of incorrect application. Apart from that, 2K systems are quite expensive and contain a considerable amount of organic solvent, which evaporates upon curing and thus is released to the environment.

An environmentally friendly alternative to liquid 2K coating compositions for liquid roofing systems are water based coating compositions containing an acrylic polymer latex or a polyurethane dispersion as a binder. While coating compositions based on polyurethane dispersions provide good mechanical strength and high flexibility, they are quite expensive due to monomer costs. While acrylic polymer latexes are cheaper than polyurethane dispersions, the mechanical properties of the obtained coatings are not always satisfactory. In particular, the coatings obtained therefrom often do not have a sufficient tensile strength and elasticity and thus their tolerance for bridging cracks is poor.

Apart from that, existing aqueous coating compositions for flexible roofing usually require long drying times upon their application, until the desired roofing has been formed. This disadvantage comes to bear particularly under cool, damp or rainy conditions. In particular a rain shower may wash the fresh coating off. Moreover, during the drying process, there is always the risk of mechanical damage to the coating.

U.S. Pat. No. 6,242,515 describes binder compositions containing acrylic polymer latexes having carbonyl groups and dihydrazides of dicarboxylic acid, such as adipic dihydrazide (ADDH). These binders are used in coating compositions for providing high tensile strength and high flexibility and reduced water uptake to the coatings. Therefore, these binders can be used in coating compositions for flexible roof coatings. However the dihydrazides of dicarboxylic acid are problematic for reasons of working hygiene.

WO 2012/038099 describes compositions for preparing flexible, waterproof roof coatings which contain a combination of a hydraulically setting binder such as Portland cement and a polymer latex. These compositions are dry powders, which cannot be used as such but are mixed with water immediately prior to their application. These aqueous compositions are not stable, have a short pot life and must be consumed directly after their preparation. This bears a certain risk of incorrect application.

WO 2014/060456 describes binder compositions based on acrylic polymer latexes which contain a modified polyalkyleneimine. The coating compositions containing such binders have good mechanical properties and are quick setting and also provide early rain fastness, i.e. the risk of the freshly applied coating being washed off by a rain shower is minimized. Unfortunately, the coating compositions are not entirely stable and agglomeration and increase in viscosity is observed during storage and the coatings tend to yellowing. Moreover, the polyalkyleneimines are expensive.

WO 2014/075969 describes the use of aqueous polymer dispersions containing
 a) at least two monomers M1 having a glass transition temperature $T_g$ of at least 25° C.,
 b) at least two monomers having a glass transition temperature $T_g$ of less than 25° C., and additional monomers M3, as binding agent for exterior paints in order to improve color retention. The use of these aqueous polymer dispersions for preparing coatings for flat roofs is not described or suggested.

There is an ongoing need for aqueous polymer compositions, which are suitable as binder for coating compositions for coating flat roofs and which avoid the disadvantages of the aqueous polymer compositions for the coating of flat roofs known so far.

It is, thus, an object of the present invention to provide aqueous polymer compositions, which can be used for the preparation of flexible roof coatings having good mechanical properties, such as high tensile strength and good elasticity, and at the same time a good long-term UV-, water- and weather-resistance. Moreover, the coating compositions on the basis of aqueous polymer latex should have quick setting properties and should be stable, in particular upon storage for elevated times and/or storage at increased temperature. In particular, stability against agglomeration and viscosity increase is desired.

It was surprisingly found that these and further objects are achieved by the liquid aqueous polymer composition, comprising an aqueous polymer latex in combination with an appropriate inorganic particulate material, as defined herein.

Therefore, a first aspect of the present invention relates to the use of a liquid aqueous polymer composition containing,
  a. an aqueous polymer latex, where the polymer in the polymer latex is made of polymerized monomers M, where the polymerized ethylenically unsaturated monomers M comprise a combination of
    i) at least two different monoethylenically unsaturated, non-ionic monomers M1, whose homopolymers have a theoretical glass transition temperature $T_g(th)$ of at least 25° C. and
    ii) at least two different monoethylenically unsaturated, non-ionic monomers M2, whose homopolymers have a theoretical glass transition temperature $T_g(th)$ of at less than 25° C.,
    where each of the monomers M1 and M2 have a solubility in deionized water of at most 50 g/L and where the total amount of monomers M1 and M2 contributes with at least 90% by weight to the total amount of the monomers M, and
  b. at least one inorganic particulate material selected from inorganic pigments, inorganic fillers and mixtures thereof,
for providing flexible roof coatings.

The liquid aqueous polymer compositions of the present invention, which contain an aqueous polymer latex and at least one inorganic particulate material, as defined herein, provide coatings having good mechanical properties such as a high tensile strength and good elasticity. In addition, the provided coatings have good UV- and weather-resistance and a good water tightness. Furthermore, the aqueous polymer compositions are stable, in particular upon storage for elevated times and/or storage at increased temperature, in particular against agglomeration and viscosity increase. Furthermore, the coatings obtained therefrom adhere very effectively to a wide variety of different substrates and are easy to apply and, in the course of the production of the roof coatings, cure rapidly and without a long drying time. Therefore, the liquid aqueous polymer compositions of the present invention can advantageously be used for providing flexible roof coatings.

A second aspect of the present invention relates to a method for providing a flexible roof coating, which comprises applying a composition as defined above as a coating to a flat roof having an inclination of not more than 15°.

As used herein, the term "polymer latex" relates to an aqueous polymer dispersion, where the polymer has a C-C backbone formed by polymerized ethylenically unsaturated monomers and where the polymer is present in the form of finely dispersed particles in an aqueous liquid phase. In the context of the term "polymer latex" the term "aqueous liquid phase" means water and aqueous compositions consisting predominately in particular at least 95% by weight of water but which may have dissolved therein components usually found in polymer latexes, such as surfactants, biocides and inorganic salts. Usually the concentration of volatile compounds in the aqueous phase is less than 1% by weight, based on the total weight of the water contained in the aqueous phase.

Here and in the following, the prefix $C_n$-$C_m$ indicates the number of carbon atoms a compound or a radical may have.

For example, "$C_1$-$C_{20}$ alkyl" means a linear or branched, saturated hydrocarbon radical (i.e. alkyl), which may have from 1 to 20 carbon atoms, and includes $C_1$-$C_4$ alkyl, such as methyl, ethyl, n-propyl, 2-propyl (=isopropyl), n-butyl, 2-butyl, 2-methylpropyl and 1,1-dimethylethyl (tert.-butyl), and also $C_5$-$C_{20}$ alkyl, such as n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 1-ethylbutyl, 2-ethylbutyl, n-heptyl, 1-methylhexyl, 2-methylhexyl, 1-ethylpentyl, 2-ethyl pentyl, 1-propylbutyl, 1-ethyl-2-methylpropyl, n-octyl, isooctyl, 2-ethylhexyl, n-nonyl, isononyl, 2-propylhexyl, n-decyl, isodecyl, 1-propylheptyl, 2-propylheptyl, n-undecyl, isoundecyl, n-dodecyl, isododecyl, stearyl and the like.

The term "theoretical glass transition temperature" and the corresponding abbreviation "$T_g(th)$", as used herein, refers to the glass transition temperature $T_g$ that a homopolymer of a particular monomer would theoretically have.

As used herein, the term "flat roof" refers to a roof having a small slope or inclination angle, respectively, in particular roofs having a slope or inclination of not more than 15°, especially of not more than 10° or not more than 5°.

The liquid aqueous polymer composition used in the present invention contains an aqueous polymer latex. The polymer in the polymer latex is made of polymerized monomers M, where the polymerized monomers M are ethylenically unsaturated monomers comprising a combination of
  i) at least two different monoethylenically unsaturated, non-ionic monomers M1, whose homopolymers have a theoretical glass transition temperature $T_g(th)$ of at least 25° C. and
  ii) at least two different monoethylenically unsaturated, non-ionic monomers M2, whose homopolymers have a theoretical glass transition temperature $T_g(th)$ of less than 25° C.

According to the invention, the monomers M1 and M2 have a solubility in deionized water of at most 50 g/L at 20° C. and 1 bar.

Further, according to the invention, non-ionic monomers M1 are used, whose homopolymers have a theoretical glass transition temperature $T_g(th)$ of at least 25° C.

Preferably, non-ionic monomers M1 are used, whose homopolymers have a theoretical glass transition temperature $T_g(th)$ of at least 35° C., more preferably of at least 45° C., in particular of at least 50° C.

Examples of the monomers M1 having a theoretical glass transition temperature of at least 25° C. are
  vinylaromatic compounds, such as vinyltoluene, alpha- and para-methylstyrene, alpha-butylstyrene, 4-n-butyl-styrene, and—preferably—styrene,
  $C_1$-$C_4$ alkyl methacrylates, namely methyl methacrylate (MMA), ethyl methacrylate, n-propyl methacrylate, isopropyl methacrylate, n-butyl methacrylate, isobutyl methacrylate and tert.-butyl methacrylate,
  $C_5$-$C_6$-cycloalkyl methacrylates, namely cyclopentyl methacrylate and cyclohexyl methacrylate,
  acrylates from the group consisting of tert.-butyl acrylate and stearyl acrylate,
  vinyl halides, e.g. chloro-, fluoro-, or bromo-substituted ethylenically unsaturated compounds, preferably vinyl chloride and vinylidene chloride,
  vinyl acetate, and
  ethylenically unsaturated nitriles, such as acrylonitrile and methacrylonitrile.

Preferably, the monomers M1 are a combination of at least one monomer M1a, which is selected from vinylaromatic hydrocarbon monomers and $C_5$-$C_6$-cycloalkyl methacrylates, and at least one monomer M1b, which is selected from $C_1$-$C_4$-alkyl esters of methacrylic acid and tert.-butyl acrylate, in particular a combination of styrene and $C_1$-$C_4$-alkyl esters of methacrylic acid.

In particular the monomers M1 are a combination of styrene and methyl methacrylate or a combination of cyclohexyl methacrylate and methyl methacrylate. Especially, the monomers M1 are a combination of styrene and methyl methacrylate.

Preferably, the weight ratio of monomers M1a to monomers M1b is from 3:1 to 1:3. More preferably, the weight ratio of monomers M1a to monomers M1b is from 2:1 to 1:2.

In a preferred embodiment of the present invention, the monomers M1 comprise styrene, and the styrene contributes with 10 to 35% by weight to the total amount of monomers M. In particular, the styrene contributes with 15 to 30% by weight and especially with 15 to 25% by weight to the total amount of monomers M.

Preferably, the total amount of monomers M1 contributes with 25 to 70% by weight, in particular with 30 to 65% by weight, especially with 30 to 60% by weight to the total amount of monomers M.

According to the invention, non-ionic monomers M2 are used, whose homopolymers have a theoretical glass transition temperature $T_g(th)$ of less than 25° C. Preferably, non-ionic monomers M2 are used, whose homopolymers have a theoretical glass transition temperature $T_g(th)$ of at most 10° C., more preferably of at most 0° C., even more preferably of at most −10° C., in particular of at most −20° C.

Examples of monomers M2 having a theoretical glass transition temperature of less than 25° C. are $C_1$-$C_{20}$ alkyl acrylates different from tert.-butyl acrylate and stearyl acrylate, such as methyl acrylate, ethyl acrylate, n- and isopropyl acrylate, n-, iso-, and sec-butyl acrylate, n- and isopentyl acrylate, n-hexyl acrylate, 2-ethylhexyl acrylate, heptyl acrylate, octyl acrylate, $C_{10}$ isoamyl guerbet acrylate, 2-propylpentyl acrylate, 1-propylheptyl acrylate, lauryl acrylate, $C_5$-$C_{20}$ alkyl methacrylates, such as n- and isopentyl methacrylate, n-hexyl methacrylate, heptyl methacrylate, octyl methacrylate, $C_{10}$ isoamyl guerbet methacrylate, 2-propylpentyl methacrylate, 2-propylheptyl methacrylate, lauryl methacrylate, vinyl esters of unbranched or branched carboxylic acids having 2 to 11 C atoms, such as vinyl propionate, vinyl butyrate, 1-methylvinyl acetate, vinyl pivalate, and vinyl esters of α-branched monocarboxylic acids having 9 C atoms (VeoVa9®, trade name of Shell), such as vinyl 2-ethylhexanoate, vinyl laurate, vinyl esters of α-branched monocarboxylic acids having 10 or 11 C atoms (VeoVa10®, VeoVa11®, trade name of Shell), and vinyl esters of branched monocarboxylic acids having 10 to 13 C atoms (Exxar Neo12), $C_1$-$C_{20}$ vinyl ethers, such as methyl vinyl ether, ethyl vinyl ether, propyl vinyl ether, butyl vinyl ether, pentyl vinyl ether, hexyl vinyl ether, heptyl vinyl ether, octyl vinyl ether, nonyl vinyl ether, decyl vinyl ether, etc., butadiene, vinylidene chloride, and butanediol monoacrylate.

Preferably, the monomers M2 having a theoretical glass transition temperature of less than 25° C. are selected from $C_1$-$C_{20}$ alkyl acrylates, which are different from tert.-butyl acrylate and stearyl acrylate, and $C_5$-$C_{20}$ alkyl methacrylates. Preferably, the at least two different monomers M2 are distinct from each other at least by the number of carbon atoms in their alkyl portion, in particular by at least 2 carbon atoms. More preferably, the monomers M2 are a combination of at least two different $C_2$-$C_{12}$-alkyl acrylates, except for tert.-butyl acrylate. In particular, the monomers M2 are a combination of n-butyl acrylate and 2-ethylhexyl acrylate.

Preferably, each of monomers M2 contributes with at least 10% by weight, more preferably with at least 15% by weight, to the total weight of monomers M. Even more preferably, the total amount of monomers M2 contributes with 20 to 75% by weight, in particular with 30 to 65% by weight, especially with 35 to 60% by weight to the total amount of monomers M.

According to the invention, the total amount of monomers M1 and M2 contributes with at least 90% by weight to the total amount of the monomers M. Preferably, the total amount of monomers M1 and M2 contribute at least 93% by weight, in particular with at least 95% by weight, and especially with at least 96% by weight, to the total amount of the monomers M.

In a preferred embodiment of the present invention, the monomers M1 have a $T_g(th)$ of at least 35° C. and the monomers M2 have a $T_g(th)$ of at most 0° C.

In a more preferred embodiment of the present invention, the monomers M1 have a $T_g(th)$ of at least 45° C. and the monomers M2 have a $T_g(th)$ of at most −10° C.

In a particular preferred embodiment of the present invention, the monomers M1 have a $T_g(th)$ of at least 50° C. and the monomers M2 have a $T_g(th)$ of at most −20° C.

In order to improve the colloidal stabilization of the aqueous polymer dispersions, in particular when the overall formulation also comprises high amounts of pigments or inorganic fillers, such as, for example, calcium carbonate, the polymerized monomers M of the aqueous polymer latex can comprise further monoethylenically unsaturated monomers having functional groups. In this case, the colloidal stabilization can for example effectively be accomplished by crosslinking, either by reaction of the functionalized groups itself or by addition of a further crosslinking agent.

Monomers that are suitable for increasing the internal strength of films of aqueous polymer dispersions are, for example, monoethylenically unsaturated monomers having at least one carboxylic acid group, amide group, hydroxyl group, epoxy group, carbonyl-group or silane group.

Accordingly, in a preferred embodiment of the present invention, the monomers M comprise at least one further monomer M3, which is selected from the group consisting of monoethylenically unsaturated $C_3$-$C_6$-monocarboxylic acids, monoethylenically unsaturated $C_4$-$C_6$-dicarboxylic acids, primary amides of monoethylenically unsaturated $C_3$-$C_6$-monocarboxylic acids, and hydroxy-$C_2$-$C_4$-alkyl esters of monoethylenically unsaturated $C_3$-$C_6$-monocarboxylic acids and mixtures thereof.

Examples of the further monomer M3 are acrylic acid, methacrylic acid, itaconic acid, fumaric acid, maleic acid, mesaconic acid, crotonic acid, citraconic acid, acryloyloxypropionic acid, methacryloyloxypropionic acid, vinylacetic acid, monomethyl itaconate, monomethyl fumarate, monobutyl fumarate, acrylamide, methacrylamide, 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate.

Preferably, the further monomer M3 is selected from acrylic acid, methacrylic acid, maleic acid, vinylacetic acid, acrylamide, methacrylamide, 2-hydroxyethyl acrylate, 2-hydroxyethyl methacrylate, 3-hydroxypropyl acrylate and 3-hydroxypropyl methacrylate. In particular, the further monomer M3 is selected from acrylic acid, methacrylic acid, acrylamide, methacrylamide, 2-hydroxyethyl acrylate, 2-hydroxyethyl methacrylate, 3-hydroxypropyl acrylate and 3-hydroxypropyl methacrylate.

The at least one further monomers M3 is typically present in minor amounts, as for example in amounts of at most 10% by weight, preferably of at most 7% by weight, in particular of at most 5% by weight or at most 4% by weight, based on the total weight of the monomers M.

In another preferred embodiment of the present invention the monomers M comprise at least one further monomer M4, which is selected from the group consisting of monoethylenically unsaturated monomers having at least one keto group and monoethylenically unsaturated monomers having at least one oxirane group and mixtures thereof.

Examples of the further monomer M4 are diacetone acrylamide, acetoacetoxyethyl acrylate, acetoacetoxyethyl methacrylate, glycidyl acrylate and glycidyl methacrylate.

The at least one further monomers M4 is typically present in minor amounts, as for example in amounts of at most 5% by weight, preferably of at most 3% by weight, in particular of at most 2% by weight, based on the total weight of the monomers M.

In another preferred embodiment of the present invention the monomers M comprise at least one further monomer M5, which is selected from the group consisting of monoethylenically unsaturated monomers having a silane group.

Examples of the further monomer M5 are (trimethoxysilyl)methyl acrylate, (trimethoxysilyl)methyl methacrylate, (trimethoxysilyl)ethyl acrylate, (trimethoxysilyl)ethyl methacrylate, (trimethoxysilyl)propyl acrylate, (trimethoxysilyl) propyl methacrylate, vinyltrimethoxysilane and vinyltriethoxysilane.

The at least one further monomers M5 is typically present in minor amounts, as for example in amounts of at most 5% by weight, preferably of at most 3% by weight, in particular of at most 2% by weight, based on the total weight of the monomers M.

If a crosslinking agent is applied to the composition, it is important not to use too much additional crosslinking agent, since residual crosslinking agent may remain in the final coatings. Too little crosslinking agent, on the other hand, may lead to coatings having a poor water resistance. The crosslinking preferably takes place only after the actual film formation.

Suitable crosslinking agents are for example polyamines or polyhydrazides such as adipic dihydrazide (ADDH), oxalic dihydrazide, phthalic dihydrazide, terephthalic dihydrazide, isophoronediamine, and 4,7-dioxadecane-1,1-O-diamine, or a crosslinking agent that carries semicarbazide or hydrazine-functional groups.

It is also possible, of course, to combine various functional groups and crosslinking mechanisms.

Preferred monoethylenically unsaturated monomers carrying crosslinking groups are acetoacetoxyethyl methacylate (AAEM), diacetonacrylamide (DAAM), and silane (meth)acrylic monomers.

Preferred crosslinking mechanisms comprise crosslinking of silane-functional groups and crosslinking of keto-functional groups with hydrazide-functional groups.

A specific embodiment of the present invention relates to the use of a liquid aqueous polymer composition, as defined above, for providing flexible roofings, where the monomers M comprise
- from 25 to 70 by weight, in particular from 30 to 65% by weight, especially from 35 to 60% by weight, based on the total weight of the monomers M, of a combination at least two monomers M1;
- from 20 to 75% weight, in particular from 30 to 65% by weight, especially from 35 to 60% by weight, based on the total weight of the monomers M, of a combination at least two monomers M2;
- from 0.1 to 10% by weight, based on the total weight of the monomers M, one or more monoethylenically unsaturated monomers, selected from the group consisting of
  - one or more monomers M3a in an amount of at most 5% by weight, based on the total amount of monomers M, which are selected from the group consisting of monoethylenically unsaturated $C_3$-$C_6$-monocarboxylic acids and monoethylenically unsaturated $C_4$-$C_6$-dicarboxylic acids;
  - one or more monomers M3b in an amount of at most 5% by weight, based on the total amount of monomers M, which are selected from the group consisting of primary amides of monoethylenically unsaturated $C_3$-$C_6$-monocarboxylic acids, and hydroxy-$C_2$-$C_4$-alkyl esters of monoethylenically unsaturated $C_3$-$C_6$-monocarboxylic acids and mixtures thereof;
  - one or more monomers M4 in an amount of at most 5% by weight, based on the total amount of monomers M, which are selected from the group consisting of monoethylenically unsaturated monomers having at least one ketogroup and monoethylenically unsaturated monomers having at least one oxirane group and mixtures thereof; and
  - one or more monomers M5 in an amount of at most 2% by weight, based on the total amount of monomers M, which are selected from the group consisting of monoethylenically unsaturated monomers having a silane group.

In this specific embodiment of the invention, the total amount of monomers M1 and M2 preferably contributes at least 93% by weight, in particular with at least 95% by weight, and especially with at least 96% by weight, to the total amount of the monomers M.

A more specific embodiment of the present invention relates to the use of a liquid aqueous polymer composition, as defined above, for providing flexible roofings, where the monomers M comprise
- from 10 to 35% by weight, in particular from 15 to 30% by weight, especially from 15 to 25% by weight, based on the total weight of the monomers M, of at least one monomer M1a, which is selected from vinylaromatic hydrocarbon monomers;
- from 15 to 60% by weight, in particular from 20 to 50% by weight, especially from 20 to 45% weight, based on the total weight of the monomers M, of at least one non-ionic monomer M1b, which is selected from $C_1$-$C_4$-alkyl esters of methacrylic acid and tert.-butyl acrylate;
- the total amount of monomers M1a and M1b being preferably from 25 to 70% by weight, in particular from 35 to 65% by weight, especially from 35 to 60% by weight, based on the total amount of monomers M;
- from 20 to 74.7% by weight, in particular 30 to 64.7% by weight, especially 35 to 60% by weight, based on the total weight of the monomers M, of a combination of at least two different $C_2$-$C_{12}$-alkyl acrylates, except for tert.-butyl acrylate;

and at least one further monomer selected from the group consisting of
- 0.1 to 5% by weight, based on the total weight of the monomers M, of one or more monomers M3;
- 0.1 to 5% by weight, based on the total weight of the monomers M, of one or more monomers M4; and
- 0.1 to 2% by weight, based on the total weight of the monomers M, of one or more monomers M5.

In this more specific embodiment of the invention, the total amount of monomers M1 and M2 preferably contributes at least 93% by weight, in particular with at least 95% by weight, and especially with at least 96% by weight, to the total amount of the monomers M.

An even more specific embodiment of the present invention relates to the use of a liquid aqueous polymer composition, as defined above, for providing flexible roofings, where the monomers M comprise

- from 10 to 35% by weight, in particular from 15 to 30% by weight, especially from 15 to 25% by weight, based on the total weight of the monomers M, of styrene;
- from 15 to 60% by weight, in particular from 20 to 50% by weight, especially from 20 to 45% by weight, based on the total weight of the monomers M, of methyl methacrylate;
- the total amount of monomers M1a and M1b being preferably from 25 to 70% by weight, in particular from 35 to 65% by weight, especially from 35 to 60% by weight, based on the total amount of monomers M;
- from 20 to 73.9% by weight, in particular 30 to 63.9% by weight, especially 35 to 60% by weight, based on the total weight of the monomers M, of a combination of n-butyl acrylate and 2-ethylhexyl acrylate in a weight ratio in the range from 1:4 to 4:1;

and at least one further monomer selected from the group consisting of

- 0.5 to 3% by weight, based on the total weight of the monomers M, of one or more monomers M3;
- 0.5 to 3% by weight, based on the total weight of the monomers M, of one or more monomers M4; and
- 0.1 to 1% by weight, based on the total weight of the monomers M, of one or more monomers M5.

In this even more specific embodiment of the invention, the total amount of monomers M1 and M2 preferably contributes at least 93% by weight, in particular with at least 95% by weight, and especially with at least 96% by weight, to the total amount of the monomers M.

For environmental reasons, it is desired that the filming of the aqueous polymer latex can be performed in the temperature range of from 0 to 40° C., so that only small amounts, or none, of a film-forming assistant are required. Thus, according to the present invention, aqueous polymer latexes are preferred wherein the latex polymer has a glass transition temperature $T_g$ in the range from −20° C. to +40° C. Even more preferred, the latex polymer of the aqueous polymer latex has a glass transition temperature $T_g$ in the range from −15° C. to +30° C. In particular, the latex polymer of the aqueous polymer latex has a glass transition temperature $T_g$ in the range from −10° C. to +20° C. These aqueous polymer latexes are capable of film forming requiring only small, or in case of latex polymers having a glass transition temperature $T_g$ of not more than 25° C. or of not more than 20° C., no film forming aids, which must be used in case the latex polymer has a higher glass transition temperature, to ensure film forming at usual application temperatures, which are frequently about 20 to 25° C.

The glass transition temperature $T_g$ as referred to herein is determined by the DSC method (differential scanning calorimetry) using a heating rate of 20 K/min and applying the midpoint measurement in accordance with ISO 11357-2:2013-05, with sample preparation preferably according to DIN EN ISO 16805:2005-07. In case of multiple polymers contained in the latex, the weight average glass transition temperature can be calculated from the glass by the following equation (1):

$$T_g(\text{average}) = m(1)^* T_g(1) + m(2)^* T_g(2) + \ldots m(n)^* T_g(n), \quad (1)$$

where m(2), m(2), ... m(n) are the mass fractions of the individual polymers 1, 2, ... and n contained in the latex and $T_g(1), T_g(2), \ldots T_g(n)$ are the glass transition temperatures of the individual polymers 1, 2, ... and n contained in the latex.

The specific weight ratios of the monomers M1 to M2 and to the optional monomers M3, M4 and M5 are determined essentially by the glass transition temperature of the polymers prepared from the mixture of all the monomers.

Thus, the controlled variation in the nature and amount of the monomers allows the skilled person in accordance with the invention to prepare aqueous polymer compositions whose polymers have a glass transition temperature within the desired range. Guidance is possible by means of the Fox equation. According to Fox (T. G. Fox, Bull. Am. Phys. Soc. 1956 [Ser. II] 1, page 123 and according to Ullmann's Enzyklopädie der technischen Chemie, vol. 19, page 18, 4th edition, Verlag Chemie, Weinheim, 1980), the glass transition temperature of copolymers can be calculated in good approximation by the following equation (2):

$$1/T_g = x^1/T_g^1 + x^2/T_g^2 + \ldots x^n/T_g^n, \quad (2)$$

where $x^1, x^2, \ldots x^n$ are the mass fractions of the monomers 1, 2, ... n and $T_g^1, T_g^2, \ldots T_g^n$ are the glass transition temperatures of the polymers constructed in each case only from one of the monomers 1, 2, ... n, in degrees Kelvin. The $T_g$ values for the homopolymers of the majority of monomers are known and are listed for example in Ullmann's Encyclopedia of Industrial Chemistry, volume A21, page 169, 5th edition, VCH Weinheim, 1992; further sources of glass transition temperatures for homopolymers include, for example, J. Brandrup, E. H. Immergut, Polymer Handbook, 1st edition, J. Wiley, New York 1966, 2nd edition, J. Wiley, New York 1975, and 3rd edition, J. Wiley, New York 1989. For ethyl acrylate a figure of −13° C. is used.

The aqueous polymer latexes are typically prepared by free radical aqueous emulsion polymerization of the monomers M, which form the aqueous polymer latex, in the presence of at least one surfactant and at least one polymerization initiator.

The conditions required for the performance of the free-radical emulsion polymerization of the monomers M are sufficiently familiar to those skilled in the art, for example from the prior art cited at the outset and from "Emulsionspolymerisation" [Emulsion Polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymere [Dispersions of Synthetic High Polymers], F. Hölscher, Springer-Verlag, Berlin (1969).

Accordingly, in the course of the emulsion polymerization, ethylenically unsaturated compounds (monomers) are polymerized in water, using ionic and/or nonionic emulsifiers and/or protective colloids or stabilizers as surface-active compounds to stabilize the monomer droplets and the polymer particles that are subsequently formed from the monomers. In accordance with the invention, however, the polymerization takes place in a low-emulsifier regime. It is preferred to use in total less than 2.5 or less than 2.0% by weight of emulsifier, more particularly less than 1.5% by weight, based on the solids content of the polymer dispersion.

The aqueous polymer latex is typically prepared in the presence of at least one surfactant for stabilizing the polymer particles in the latex against agglomeration or segregation. A comprehensive description of suitable protective colloids is found in Houben-Weyl, Methoden der organischen Chemie, volume XIV/1, Makromolekulare Stoffe, Georg Thieme Verlag, Stuttgart, 1961, pp. 411 to 420. Suitable emulsifiers are also found in Houben-Weyl, Methoden der organischen Chemie, volume 14/1, Makromolekulare Stoffe, Georg Thieme Verlag, Stuttgart, 1961, pages 192 to 208.

Suitable emulsifiers include anionic, cationic, and non-ionic emulsifiers. As surface-active substances it is preferred to use emulsifiers, whose relative molecular weights are typically below those of protective colloids. More particularly it has become established to use exclusively anionic emulsifiers, or to use a combination of at least one anionic emulsifier and at least one nonionic emulsifier.

Useful nonionic emulsifiers are araliphatic or aliphatic nonionic emulsifiers, examples being ethoxylated mono-, di-, and tri-alkylphenols (EO degree: 3 to 50, alkyl radical: $C_4$-$C_{10}$), ethoxylates of long-chain alcohols (EO degree: 3 to 100, alkyl radical: $C_8$-$C_{36}$), and also polyethylene oxide/polypropylene oxide homopolymers and copolymers. These copolymers may comprise the alkylene oxide units copolymerized with statistical distribution or in the form of blocks. Highly suitable, for example, are EO/PO block copolymers. Preference is given to using ethoxylates of long-chain alkanols (alkyl radical $C_{10}$-$C_{30}$, average degree of ethoxylation 5 to 100) and, of these, particular preference to those having a linear $C_{12}$-$C_{20}$ alkyl radical and an average degree of ethoxylation of 10 to 50, and also ethoxylated monoalkylphenols.

Suitable anionic emulsifiers are, for example, alkali metal salts and ammonium salts of alkyl sulfates (alkyl radical: $C_8$-$C_{22}$), of sulfuric monoesters with ethoxylated alkanols (EO degree: 2 to 50, alkyl radical: $C_{12}$-$C_{18}$) and with ethoxylated alkylphenols (EO degree: 3 to 50, alkyl radical: $C_4$-$C_9$), of alkylsulfonic acids (alkyl radical: $C_{12}$-$C_{18}$), and of alkylarylsulfonic acids (alkyl radical: $C_9$-$C_{18}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192-208. Anionic emulsifiers likewise suitable are bis(phenylsulfonic acid) ethers and their alkali metal salts or ammonium salts which carry a $C_4$-$C_{24}$ alkyl group on one or both aromatic rings. These compounds are general knowledge, for example from U.S. Pat. No. 4,269,749, and are available commercially, for example in the form of Dowfax® 2A1 (Dow Chemical Company).

Suitable cationic emulsifiers are preferably quaternary ammonium halides, examples being trimethylcetylammonium chloride, methyltrioctylammonium chloride, and benzyltriethylammonium chloride, or quaternary compounds of N—$C_6$-$C_{20}$ alkylpyridines, -morpholines, or -imidazoles, an example being N-laurylpyridinium chloride.

The aqueous polymer dispersions may also be admixed with customary auxiliaries and additives. These include, for example, pH modifiers, reducing agents, and bleaching agents, such as the alkali metal salts of hydroxymethanesulfinic acid (e. g., Rongalit® C from BASF Aktiengesellschaft), complexing agents, deodorants, odorants, and viscosity modifiers, such as alcohols, examples being glycerol, methanol, ethanol, tert-butanol, glycol, etc. These auxiliaries and additives may be added to the polymer dispersions in the initial charge, in one of the feeds, or after the end of the polymerization.

The acid groups of the first polymer are preferably neutralized by at least partial introduction of a neutralizing agent before and/or during the polymerization of the second stage. This neutralizing agent may be added in a common feed with the monomers to be polymerized, or in a separate feed. Following the feeding of all of the monomers, the amount of neutralizing agent present in the polymerization vessel is preferably the amount required for the neutralizing of at least 10%, preferably 25 to 100% or 50 to 95% of acid equivalents.

The free-radically initiated aqueous emulsion polymerization is triggered by means of a free-radical polymerization initiator (free-radical initiator). These may in principle be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates, and redox initiator systems.

The stated free-radical initiators are used mostly in the form of aqueous solutions, with the lower concentration being determined by the amount of water that is acceptable in the dispersion, and the upper concentration by the solubility of the respective compound in water. In general, the amount of the free-radical initiator used, based on the total amount of monomers M, which form the carboxylated acrylic polymer latex, is 0.01 pphm to 5 pphm, preferably 0.1 pphm to 3 pphm. It is also possible for two or more different initiators to find use for the emulsion polymerization.

The amount of free-radical initiator required for the emulsion polymerization of the monomers M can be initially charged in the polymerization vessel completely.

However, it is also possible to charge none of or merely a portion of the free-radical initiator, e.g. not more than 30% by weight, especially not more than 20% by weight, based on the total amount of the free-radical initiator required in the aqueous polymerization medium and then, under polymerization conditions, during the free-radical emulsion polymerization of the monomers M to add the entire amount or any remaining residual amount, according to the consumption, batch wise in one or more portions or continuously with constant or varying flow rates.

More particularly, it has been found to be suitable to establish the polymerization conditions and to initially charge at least a portion of the free-radical initiator into the polymerisation vessel bevor the metering of the monomers M is started.

For the free-radically initiated aqueous emulsion polymerization the monomers M can be initially charged entirely in the reaction vessel or be fed in over the course of polymerization. More particularly, it has been found to be useful to add the majority of the monomers M, especially at least 95% by weight, or the entirety of the monomers M to the polymerization reaction under polymerization conditions. Preferably, the monomers M are added over a period of at least 30 minutes, especially over a period of 0.5 to 10 h and particularly over a period of 1 to 5 h. The monomers M can be added in substance or preferably in the form of an aqueous emulsion. Preferably, the monomers M are added continuously at constant flow rates. Preferably, the entirety of the monomers M is metered in.

It has been found advantageous to perform the free-radical emulsion polymerization in the presence of a seed latex. A seed latex is a polymer latex which is present in the aqueous polymerization medium before the metering of the monomers M is started. The seed latex may help to better adjust the particle size or the final polymer latex obtained in the free-radical emulsion polymerization of the invention.

Principally every polymer latex may serve as a seed latex. For the purpose of the invention, preference is given to seed latices, where the particle size of the polymer particles is comparatively small. In particular, the Z average particle diameter of the polymer particles of the seed latex, as determined by dynamic light scattering at 20° C. (see below) is preferably in the range from 10 to 80 nm, in particular form 10 to 50 nm. Preferably, the polymer particles of the seed latex is made of ethylenically unsaturated monomers, which comprise at least 95% by weight, based on the total weight of the monomers forming the seed latex, of one or more monomers M1 as defined above.

For this, the seed latex is usually charged into the polymerisation vessel bevor the metering of the monomers M is started. In particular, the seed latex is charged into the polymerisation vessel followed by establishing the polymerization conditions and charging at least a portion of the free-radical initiator into the polymerisation vessel before the metering of the monomers M is started.

The amount of seed latex, calculated as solids, may frequently be in the range from 0.1 to 10% by weight, in particular from 0.5 to 5% by weight, based on the total weight of the monomers M to be polymerized.

The free-radical aqueous emulsion polymerization can be conducted at temperatures in the range from 0 to 170° C. Temperatures employed are generally in the range from 50 to 120° C., frequently 60 to 120° C. and often 70 to 110° C. The free-radical aqueous emulsion polymerization can be conducted at a pressure of less than, equal to or greater than 1 atm (atmospheric pressure), and so the polymerization temperature may exceed 100° C. and may be up to 170° C. Polymerization of the monomers is normally performed at ambient pressure but it may also be performed under elevated pressure. In this case, the pressure may assume values of 1.2, 1.5, 2, 5, 10, 15 bar (absolute) or even higher values. If emulsion polymerizations are conducted under reduced pressure, pressures of 950 mbar, frequently of 900 mbar and often 850 mbar (absolute) are established. Advantageously, the free-radical aqueous emulsion polymerization of the monomers M, which form the aqueous polymer latex, is conducted at ambient pressure (about 1 atm) with exclusion of oxygen, for example under an inert gas atmosphere, for example under nitrogen or argon.

The polymerization of the monomers M can optionally be conducted in the presence of chain transfer agents. Chain transfer agents are understood to mean compounds that transfer free radicals and which reduce the molecular weight of the polymer or control chain growth in the polymerization. Examples of chain transfer agents are aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and the isomeric compounds thereof, n-octanethiol and the isomeric compounds thereof, n-nonanethiol and the isomeric compounds thereof, n-decanethiol and the isomeric compounds thereof, n-undecanethiol and the isomeric compounds thereof, n-dodecanethiol and the isomeric compounds thereof, n-tridecanethiol and isomeric compounds thereof, substituted thiols, for example 2-hydroxyethanethiol, aromatic thiols such as benzenethiol, ortho-, meta- or para-methylbenzenethiol, alkylesters of mercaptoacetic acid (thioglycolic acid) such as 2-ethylhexyl thioglycolate, alkylesters of mercaptopropionic acid such as octyl mercapto propionate, and also further sulfur compounds described in Polymer Handbook, 3rd edition, 1989, J. Brandrup and E. H. Immergut, John Wiley & Sons, section II, pages 133 to 141, but also aliphatic and/or aromatic aldehydes such as acetaldehyde, propionaldehyde and/or benzaldehyde, unsaturated fatty acids such as oleic acid, dienes having nonconjugated double bonds, such as divinylmethane or vinylcyclohexane, or hydrocarbons having readily abstractable hydrogen atoms, for example toluene. Alternatively, it is possible to use mixtures of the aforementioned chain transfer agents that do not disrupt one another. The total amount of chain transfer agents optionally used in the process of the invention, based on the total amount of monomers M, will generally not exceed 1% by weight.

The free-radically initiated aqueous emulsion polymerization of the monomers M is naturally effected in an aqueous polymerization medium. The aqueous polymerization medium may in principle comprise minor amounts 5% by weight) of water-soluble organic solvents, for example methanol, ethanol, isopropanol, butanols, pentanols, but also acetone, etc. Preferably, however, the free-radically initiated aqueous emulsion polymerization of the monomers M is conducted in the absence of such solvents.

The emulsion polymerization produces aqueous polymer dispersions generally with solids contents of 15 to 75% by weight, preferably of 40 to 75% by weight, more preferably of greater than or equal to 45% by weight. For a high space/time yield of the reactor, dispersions with very high solids content are preferred. In order to be able to attain solids contents >60% by weight, a bimodal or polymodal particle size distribution ought to be brought about, since otherwise the viscosity becomes too high and the dispersion can no longer be handled. Producing a new particle generation can be accomplished, for example, by adding seed (EP 81083), by adding excess amounts of emulsifier, or by adding miniemulsions. A further advantage associated with the low viscosity at high solids content is the improved coating performance at high solids contents. Producing one or more new particle generations may take place at any desired point in time. Said point in time is guided by the particle size distribution that is aimed at for a low viscosity.

Frequently, it is advantageous if the aqueous polymer dispersion obtained after the end of the polymerization stages is subjected to an aftertreatment for the purpose of reducing the residual monomer content. This aftertreatment takes place either chemically, as for example by completing the polymerization reaction by using a more effective radical initiator system (known as postpolymerization), and/or physically, as for example by stripping the aqueous polymer dispersion with steam or inert gas. Corresponding chemical and/or physical methods are familiar to the skilled person [see, for example, EP-A 771 328, DE-A 196 24 299, DE-A 196 21 027, DE-A 197 41 184, DE-A 197 41 187, DE-A 198 05 122, DE-A 198 28 183, DE-A 198 39 199, DE-A 198 40 586, and 198 47 115]. The combination of chemical and physical aftertreatment affords the advantage that as well as the unreacted ethylenically unsaturated monomers, other disruptive volatile organic constituents (known as VOCs or volatile organic compounds) are also removed from the aqueous polymer dispersion. The dispersions according to the invention are preferably not chemically aftertreated.

In the aqueous polymer latex, the dispersed polymers are in the form of polymer particles. The polymer particles typically have a weight-average diameter $D_w$ in the range from 50 to 1000 nm, in particular in the range from 60 to 700 nm and especially in the range from 100 to 6000 nm. Determination of the weight average particle diameters is known to the person skilled in the art and is carried out, for example, by the analytical ultracentrifugation method. In this specification, weight-average particle diameter is understood as meaning the weight-average $D_{w50}$ value determined by the method of analytical centrifugation (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175). The weight-average particle diameter can also be determined by HDC (Hydrodynamic Chromatography fractionation), as for example described by H. Wiese, "Characterization of Aqueous Polymer Dispersions" in Polymer Dispersions and Their Industrial Applications (Wiley-VCH, 2002), pp. 41-73. For example, HDC measurements can be carried out using a PL-PSDA particle size distribution analyzer (Polymer Laboratories, Inc.), by injecting a small amount of sample into an aqueous eluent containing an emulsifier, resulting in a concentration of approx. 0.5 g/l and pumping the resulting mixture through a glass capillary tube of approx. 15 mm diameter packed with polystyrene spheres. As determined by their hydrodynamic diameter, smaller particles can sterically access regions of slower flow in capillaries, such that on average the smaller particles experience slower elution flow. The fractionation can be finally monitored using e.g. an UV-detector which measured the extinction at a fixed wavelength of 254 nm.

The size of the polymer particles can also be characterized by dynamic light scattering. From of the measured autocorrelation function, the cumulant Z average diameter of the particles is calculated in accordance with ISO Standard 13321. Typically, the weight-average diameter $D_w$ is comparable to the cumulant Z average diameter of the particles. Thus, the polymer particles applied in the present invention typically have a cumulant Z average in the range from 50 to 1000 nm, in particular in the range from 60 to 700 nm and especially in the range from 100 to 600 nm.

The aqueous polymer dispersion typically has a solids content of 15 to 75% by weight, preferably of 40 to 75% by weight, in particular of 45 to 62% by weight.

The aqueous polymer dispersion obtained can be used as such or mixed with other, generally film-forming, polymers as a binder composition in the liquid aqueous polymer composition.

According to the invention, the liquid aqueous polymer composition used in the present invention further contains at least one inorganic particulate material selected from inorganic pigments, inorganic fillers and mixtures thereof.

Examples of suitable inorganic pigments are inorganic white pigments such as titanium dioxide, preferably in the rutile form, barium sulfate, zinc oxide, zinc sulfide, basic lead carbonate, antimony trioxide, lithopone (zinc sulfide+ barium sulfate), or colored pigments, examples being iron oxides, carbon black, graphite, zinc yellow, zinc green, ultramarine, manganese black, antimony black, manganese violet, Paris blue or Schweinfurter green. Preferably, the inorganic pigments are selected from inorganic white pigments.

The total concentration of inorganic pigments in the aqueous coating composition, if present, is frequently in the range from 1 to 25% by weight, in particular from 2 to 15% by weight, based on the total weight of the coating composition.

Suitable inorganic fillers are, for example, aluminum silicates, such as feldspars, silicates, such as kaolin, calcium silicates, alkalimetal silicates, talc, mica, magnesite, tobermorite, xonolite, alkaline earth carbonates, such as natural calcium carbonates, in the form for example as calcite or chalk, synthetic calcium carbonates and magnesium carbonate, dolomite, alkaline earth metal sulfates, such as calcium sulfate and silicon dioxide.

Fillers may also be flatting agents which significantly impair the gloss as desired. Flatting agents are generally transparent and may be either organic or inorganic. Examples of flatting agents are inorganic silicates, for example the Syloid® brands from W. R. Grace & Company and the Acematt® brands from Evonik GmbH. Organic flatting agents are obtainable, for example, from BYK-Chemie GmbH under the Ceraflour® brands and the Ceramat® brands, and from Deuteron GmbH under the Deuteron MK® brand.

In a preferred embodiment of the invention, the liquid aqueous polymer composition contains at least one inorganic filler, selected from the group consisting of natural calcium carbonates, synthetic calcium carbonates, calcium silicates, aluminum silicates and alkalimetal silicates.

It has been found that a particular high tensile strength can be obtained without significantly effecting elongation at break if very finely divided inorganic fillers, are applied to the aqueous polymer compositions. These finely divided fillers have a particle size in the range from 0.1 to 25 μm, in particular in the range of from 0.1 to 10 μm.

In connection with the inorganic particulate material, i.e. the inorganic filler and/or the inorganic pigments, the term "particle size" refers to the average particle size of the inorganic fillers and/or the inorganic pigments, as determined by laser diffraction in accordance to ISO 13320:2009.

The fillers may be used in the form of individual components. In practice, however, filler mixtures have been found to be particularly useful, for example calcium carbonate/kaolin, calcium carbonate/talc.

In an even more preferred embodiment of the invention, the liquid aqueous polymer composition contains at least one inorganic filler, as defined above, where at least 90% by weight of the particles of the inorganic filler have a particle size in the range from 0.1 to 25 µm, in particular in the range of from 0.1 to 10 µm.

In view of tear strength, it has been found beneficial, if the inorganic filler comprises an effective amount of particles, which have a particle size of below 2 µm, in particular of at most 1.8 µm and especially of at most 1.5 µm, e.g. in the range from 0.1 to <2 µm, in particular in the range from 0.1 to 1.8 µm, especially in the range from 0.3 to 1.5 µm. In particular it was found beneficial, if the inorganic filler comprises, based on the total amount of the filler, at least 50% by weight, more particularly at least 80% by weight or at least 90% by weight of particles, which have a particle size of below 2 µm, in particular of at most 1.8 µm and especially of at most 1.5 µm, e.g. in the range from 0.1 to <2 µm, in particular in the range from 0.1 to 1.8 µm, especially in the range from 0.3 to 1.5 µm. Of course, a mixture of fillers, which differ in average particle sizes can be used, e. g. a mixture of a first filler wherein at least 90% by weight of the particles have a particle size in the range from 0.1 to <2 µm, in particular in the range from 0.1 to 1.8 µm, especially in the range from 0.3 to 1.5 µm, and a second filler, wherein at least 90% by weight of the particles have a particle size in the range from 2 to 25 µm, in particular in the range from 2 to 10 µm, especially in the range from 3 to 10 µm. In this case the weight ratio of the first filler to the second filler is preferably in the range from 1:9 to 9:1, in particular in the range from 1:1 to 9:1 and especially in the range from 4:1 to 9:1.

Such finely divided fillers are for example calcium carbonates with an average particle size of less than 2 µm. Generally, these fillers are commercially available in the form of slurries, i.e. in the form of aqueous dispersions, which allows an easy handling. Suitable calcium carbonate slurries are for example obtainable from the company Omya, Offringen, Switzerland under the trade name Hydrocarb, e.g. Hydrocarb 95 with an average particle size of 0.7 µm.

The total concentration of filler in the aqueous coating composition is frequently in the range from 10 to 50% by weight, in particular from 20 to 45% by weight, based on the total weight of the coating composition.

In a further preferred embodiment of the invention, the liquid aqueous polymer composition additionally contains at least one inorganic white pigment.

The inventive coating compositions contain the inorganic particular material usually in such amounts that the coating composition has pigment volume concentration PVC of at least 10. Frequently, the PVC will not exceed a value of 50 and is preferably in the range from 15 to 50 and specifically in the range from 20 to 45. The PVC describes the ratio of the volumes of pigments ($V_P$) and fillers ($V_F$) relative to the total volume, consisting of the volumes of binder ($V_B$), pigments and fillers in a dried coating film in percent:

$$PVC = (V_P + V_F) \times 100 / (V_P + V_F + V_B).$$

Thus, in a preferred embodiment of the invention, the aqueous polymer composition has a pigment volume concentration (PVC) in the range from 15 to 50%, in particular in the range of 20 to 45%.

The aqueous polymer composition of the invention may comprise further auxiliaries in addition to the aqueous polymer latex and the at least one particulate inorganic material.

The customary auxiliaries, as well as the emulsifiers used in the polymerization, include wetting agents or dispersants, such as sodium, potassium, or ammonium polyphosphates, alkali metal salts and ammonium salts of acrylic or maleic anhydride copolymers, polyphosphonates, such as sodium 1-hydroxyethane-1,1-diphosphonate, and also naphthalenesulfonic salts, more particularly the sodium salts.

The aqueous polymer compositions of the invention may contain customary auxiliaries, including e.g. one or more of the following:
dispersants,
in-can preservatives, and/or film preservatives
thickeners,
defoamers,
flow promoters, and
anti-freeze agents.

Dispersants are, for example, sodium polyphosphates, potassium polyphosphates or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof. Generally speaking, the amount of dispersant used is 0.5% to 6%, preferably 1% to 3% by weight, based on the amount of pigment and/or filler.

Suitable thickeners are, for example, associative thickeners, such as polyurethane thickeners. The amount of the thickener is generally less than 2.5% by weight and more preferably less than 1.5% by weight, and especially 0.05% to 1% by weight, based on the solids content of the coating composition.

Suitable defoamers include polydimethylsiloxanes, aqueous wax dispersions and acetylenic diols such as TMDD.

Suitable in-can preservatives and film preservatives are in particular fungicides, algicides and bactericides, which prevent microbial spoilage of the coating composition and formation of algae on the coating.

Suitable anti-freeze agents include water miscible organic solvent, especially aliphatic alcohols such as ethanol, isopropanol, butanols, ethylene glycol, propylene glycol and glycerin.

Auxiliaries additionally suitable are film-forming assistants or coalescence aids. Preference is given to using, for example, white spirit, ethylene glycol, propylene glycol, glycerol, ethanol, methanol, water-miscible glycol ethers and their acetates such as diethylene glycol, 1-methoxy-2-propanol, 2-amino-2-methyl-1-propanol, isooctanol, butylglycol, butyldiglycol, diethylene glycol monobutyl ether, dipropylene glycol monomethyl ether or dipropylene glycolmonobutyl ether, dipropylene glycol methyl ether, dipropylene glycol propyl ether, dipropylene glycol n-butyl ether, tripropylene glycol n-butyl ether, propylene glycol phenyl ether, butylglycol acetate, butyl diglycol acetate, 2,2,4-trimethyl-1,3-pentanediol monoisobutyrate, disobutyl esters of long-chain dicarboxylic acids, such as Lusolvan® FBH, or tripropylene glycol monoisobutyrate.

The aqueous polymer compositions of the invention are produced in a known way by blending the components in mixing devices customary for the purpose. It has been found appropriate to first prepare an aqueous paste or dispersion from the pigments, water, and optionally the auxiliaries, and only then to add and mix the polymeric latex—that is, in general, the aqueous dispersion of the polymer—with the pigment paste or pigment dispersion.

The aqueous polymer compositions of the invention contain in general 40 to 80% by weight, preferably 50 to 75% by weight, in particular, 55 to 75% by weight of nonvolatile constituents. The term "nonvolatile constituents" refers to all constituents of the preparation that are not water, but at least the total amount of binder, pigment, and auxiliary, based on the solids content of the paint. The volatile constituents are primarily water.

Preferably, the aqueous polymer compositions of the invention have a low VOC content and contains in particular less than 0.1% by weight, in particular less than 0.05% by weight of volatile organic compounds. The "VOC content" as herein referred to relates to the total concentration of volatile organic compounds as determined in accordance with DIN ISO 11890-2:2013-07.

The aqueous polymer compositions of the invention are notable for ease of handling, good storage stability and good processing properties. They have good performance properties, including for example early rain fastness, quick setting, good flexibility, such as high elongation at break, sufficient rigidity, good water resistance and small water uptake. Moreover, the coating compositions have usually high wet adhesion, and they exhibit good flow on application. Moreover, the coating compositions frequently show good adhesion to hydrophobic substrates such as existing roof coatings based on organic polymers. Moreover, the equipment used can be easily cleaned with water.

The liquid aqueous polymer compositions of the invention can advantageously be used for providing flexible roofing, i.e. for coating flat or inclined building parts.

Thus, the invention also relates to a method for providing a flexible roofing on a flat roof. This method comprises applying an aqueous polymer composition of the present invention to a flat roof, in particular to a roof having a slope or inclination of not more than 15°, especially of not more than 10° or not more than 5°.

The material of the roof to which the aqueous polymer composition is applied is not particularly limited, and includes mineral substrates, such as renders, plasters or gypsum plasterboard panels, masonry or concrete, wood, wood-based materials, metal, fiber cement and roofs having already a roofing based on bitumen, tar paper or on organic polymers, including foliar flexible roofings based on of polyurethane, PVC or EPDM or TPO and liquid roofings.

The application rate of the coating composition to the surface of the substrate to be coated may vary and is typically 750 to 3500 g/m$^2$, in particular in the range form 1200 to 3000 g/m$^2$ (calculated on a wet basis) resulting in average coating strength of 800 to 2300 μm, in particular in the range form 450 to 2000 μm (calculated on a dry film basis).

Application may take place in a conventional way, by spraying, troweling, knifing, rolling or pouring. The coating compositions of the invention can be applied to the surface of the flat roof within a wide temperature range, e.g. at a temperature in the range from 0 to 50° C., in particular at a temperature from 5 to 40° C.

EXAMPLES

Analytics 1.1 The solids contents of the aqueous polymer latexes were generally determined by drying a defined amount of the aqueous polymer dispersion (about 0.8 g) at a temperature of 130° C. to constant weight (about 2 hours) with the aid of the moisture analyzer HR73 from Mettler Toledo. Two separate measurements were conducted. The value reported in the example is the mean of the two measurements.

1.2 The particle diameter of the aqueous polymer latexes were determined by dynamic light scattering of an aqueous polymer dispersion diluted with deionized water to 0.005 to 0.01% by weight at 23° C. by means of an Autosizer IIC from Malvern Instruments, England. What is reported is the cumulant Z average diameter calculated from of the measured autocorrelation function (ISO Standard 13321).

1.3 The glass transition temperatures of the polymer latexes were determined by the DSC method (Differential Scanning calorimetry, 20 K/min, midpoint measurement, DIN 53765:1994-03) by means of a DSC instrument (Q 2000 series from TA instruments).

1.4 The pH values of the polymer latexes were determined by using a pH-meter with standard glass electrode.

Preparation of the Carboxylated Acrylic Polymer Latexes and Iminated Acrylic Polymer Latexes Example 1

500.0 g deionized water and 22.73 g of polystyrene seeds, with a particle diameter of 28 nm and a solids content of 33%, were charged in a 4 l glass vessel, equipped with an anchor stirrer, heating and cooling devices, as well as various inlets, at 20 to 25° C. (room temperature) and atmospheric pressure (1 atm≙1013 bar absolute) and then heated to an internal temperature of 80° C. with stirring (140 rpm). After having reached this temperature, the initiator solution was added in one portion and the resulting mixture was stirred for 5 minutes. Subsequently, the monomer emulsion was metered in over the course of 180 minutes.

Initiator Solution:

| | |
|---|---|
| 6 g | Sodium peroxodisulfate |
| 79.71 g | Deionized water |

Monomer Emulsion:

| | |
|---|---|
| 445.28 g | deionized water |
| 18.75 g | of a 20% by weight aqueous solution of a fatty alcohol polyethoxylate (Lutensol ® AT 18 from the company BASF SE) |
| 50.0 g | of a 15% by weight aqueous solution of sodium laurylsulfate |
| 300 g | styrene |
| 435 g | n-butyl acrylate |
| 360 g | methyl methacrylate |
| 375 g | ethylhexyl acrylate |
| 15 g | acrylic acid and |
| 30 g | of a 50 wt.-% aqueous solution of acrylamide |

Then, 50 g of water was added, and the reaction mixture was allowed to react for a further 30 minutes at the above-mentioned temperature. Following this 30 g of a 10% aqueous solution of tert.-butyl hydroperoxide was added and the mixture was cooled to 75° C. Then, 30 g of a 10% aqueous solution of sodium hydroxymethanesulfinate was added over 60 minutes. 40 g of water was added. The resulting aqueous polymer dispersion was then adjusted to a pH of 8.2 using 58 g of a 10% by weight aqueous sodium hydroxide solution. The resulting polymer dispersion had a solids content of 53.7% by weight, a number-average particle diameter of 197 nm and a glass transition temperature of 2.3° C.

Example 2

500.0 g Deionized water and 22.21 g of polystyrene seeds, with a particle diameter of 28 nm and a solids content of 33%, were charged in a 4 l glass vessel, equipped with an anchor stirrer, heating and cooling devices, as well as various inlets, at 20 to 25° C. (room temperature) and atmospheric pressure (1 atm≙1013 bar absolute) and then heated to an internal temperature of 80° C. with stirring (140 rpm). After having reached this temperature, 22.4 g of the initiator solution was added in one portion and the resulting mixture was stirred for 5 minutes. Subsequently, the monomer emulsion was metered in over the course of 180 minutes, and the remainder of the initiator solution was simultaneously metered in, but over a period of 195 minutes.

Initiator Solution:

| | |
|---|---|
| 5.6 g | Sodium peroxodisulfate |
| 218.4 g | Deionized water |

Monomer Emulsion:

| | |
|---|---|
| 415.62 g | deionized water |
| 17.5 g | of a 20% by weight aqueous solution of a fatty alcohol polyethoxylate (Lutensol ® AT 18 from the company BASF SE) |
| 46.67 g | of a 15% by weight aqueous solution of sodium laurylsulfate |
| 280 g | styrene |
| 406 g | n-butyl acrylate |
| 329 g | methyl methacrylate |
| 350 g | ethylhexyl acrylate |
| 7 g | vinyltriethoxysilane |
| 14 g | acrylic acid and |
| 28 g | of a 50 wt.-% aqueous solution of acrylamide |

Then, 50 g of water was added, and the reaction mixture was allowed to react for a further 30 minutes at the above-mentioned temperature. Following this 28 g of a 10% aqueous solution of tert.-butyl hydroperoxide was added and the mixture was cooled to 75° C. Then, 28 g of a 10% aqueous solution of sodium hydroxymethanesulfinate was added over 60 minutes. 40 g of water was added. The resulting aqueous polymer dispersion was then adjusted to a pH of 8.1 using 55 g of a 10% by weight aqueous sodium hydroxide solution. The resulting polymer dispersion had a solids content of 49.9% by weight, a number-average particle diameter of 185 nm and a glass transition temperature of 2.0° C.

Example 3

500.0 g deionized water and 21.21 g of polystyrene seeds, with a particle diameter of 28 nm and a solids content of 33%, were charged in a 4 l glass vessel, equipped with an anchor stirrer, heating and cooling devices, as well as various inlets, at 20 to 25° C. (room temperature) and atmospheric pressure (1 atm≙1013 bar absolute) and then heated to an internal temperature of 80° C. with stirring (140 rpm). After having reached this temperature, 22.4 g of the initiator solution was added in one portion and the resulting mixture was stirred for 5 minutes. Subsequently, the monomer emulsion was metered in over the course of 195 minutes.

Initiator Solution:

| | |
|---|---|
| 5.6 g | sodium peroxodisulfate |
| 218.4 g | deionized water |

Monomer Emulsion:

| | |
|---|---|
| 415.62 g | deionized water |
| 17.5 g | of a 20% by weight aqueous solution of a fatty alcohol polyethoxylate (Lutensol ® AT 18 from the company BASF SE) |
| 46.67 g | of a 15% by weight aqueous solution of sodium laurylsulfate |
| 280 g | styrene |
| 406 g | n-butyl acrylate |
| 326 g | methyl methacrylate |
| 350 g | ethylhexyl acrylate |
| 7 g | acrylic acid and |
| 28 g | of a 50 wt.-% aqueous solution of acrylamide |

Then, 50 g of water was added, and the reaction mixture was allowed to react for a further 30 minutes at the above-mentioned temperature. Following this, 28 g of a 10% aqueous solution of tert.-butyl hydroperoxide was added and the mixture was cooled to 75° C. Then, 28 g of a 10% aqueous solution of sodium hydroxymethanesulfinate was added over 60 minutes. 40 g of water was added. The resulting aqueous polymer dispersion was then adjusted to a pH of 7.9 using 55 g of a 10% by weight aqueous sodium hydroxide solution. The resulting polymer dispersion had a solids content of 50% by weight, a number-average particle diameter of 186 nm and a glass transition temperature of 2.0° C.

Example 4

500.0 g deionized water and 22.73 g of polystyrene seeds, with a particle diameter of 28 nm and a solids content of 33%, were charged in a 4 l glass vessel, equipped with an anchor stirrer, heating and cooling devices, as well as various inlets, at 20 to 25° C. (room temperature) and atmospheric pressure (1 atm≙1013 bar absolute) and then heated to an internal temperature of 80° C. with stirring (140 rpm). After having reached this temperature, 8.57 g of the initiator solution was added in one portion and the resulting mixture was stirred for 5 minutes. Subsequently, the monomer emulsion was metered in over the course of 195 minutes.

Initiator Solution:

| | |
|---|---|
| 6 g | sodium peroxodisulfate |
| 79.71 g | deionized water |

Monomer Emulsion:

| | |
|---|---|
| 457.53 g | deionized water |
| 18.75 g | of a 20% by weight aqueous solution of a fatty alcohol polyethoxylate (Lutensol ® AT 18 from the company BASF SE) |
| 50 g | of a 15% by weight aqueous solution of sodium laurylsulfate |
| 225 g | styrene |
| 465 g | n-butyl acrylate |
| 341.25 g | methyl methacrylate |
| 420 g | ethylhexyl acrylate |
| 9 g | acetoacetoxyethyl methacrylate |
| 3.75 g | vinyltriethoxysilane |
| 15 g | acrylic acid and |
| 12 g | of a 50 wt.-% aqueous solution of acrylamide |

Then, 50 g of water was added, and the reaction mixture was allowed to react for a further 30 minutes at the above-mentioned temperature. Following this, 30 g of a 10% aqueous solution of tert.-butyl hydroperoxide was added and the mixture was cooled to 75° C. Then, 30 g of a 10% aqueous solution of sodium hydroxymethanesulfinate was added over 60 minutes. 40 g of water was added. The resulting aqueous polymer dispersion was then adjusted to a pH of 7.9 using 54 g of a 10% by weight aqueous sodium hydroxide solution. The resulting polymer dispersion had a solids content of 53.2% by weight, a number-average particle diameter of 181 nm and a glass transition temperature of −6.6° C.

Reference Example 5

500.0 g deionized water and 22.73 g of polystyrene seeds, with a particle diameter of 28 nm and a solids content of 33%, were charged in a 4 l glass vessel, equipped with an anchor stirrer, heating and cooling devices, as well as various inlets, at 20 to 25° C. (room temperature) and atmospheric pressure (1 atm≙1013 bar absolute) and then heated to an internal temperature of 80° C. with stirring (140 rpm). After having reached this temperature, 5.84 g of the initiator solution was added in one portion and the resulting mixture was stirred for 5 minutes. Subsequently, the monomer emulsion was metered in over the course of 180 minutes, and the remainder of the initiator solution was simultaneously metered in, but over a period of 195 minutes.

Initiator Solution:

| | |
|---|---|
| 6 g | sodium peroxodisulfate |
| 114 g | deionized water |

Monomer Emulsion:

| | |
|---|---|
| 417.24 g | deionized water |
| 18.75 g | of a 20% by weight aqueous solution of a fatty alcohol polyethoxylate (Lutensol ® AT 18 from the company BASF SE) |
| 50 g | of a 15% by weight aqueous solution of sodium laurylsulfate |
| 627 g | styrene |
| 840 g | n-butyl acrylate |
| 30.43 g | methyl methacrylate |
| 15 g | acrylic acid |
| 30 g | of a 50% by weight aqueous solution of acrylamide |

Then, 28.33 g of water was added, and the reaction mixture was allowed to react for a further 30 minutes at the abovementioned temperature. Following this, 30 g of a 10% aqueous solution of tert.-butyl hydroperoxide was added and the mixture was cooled to 75° C. Then, 30 g of a 10% aqueous solution of sodium hydroxymethanesulfinate was added over 60 minutes. 40 g of water was added. The resulting aqueous polymer dispersion was then adjusted to a pH of 7.2 using 43.5 g of a 10% by weight aqueous sodium hydroxide solution. The resulting polymer dispersion had a solids content of 54.0% by weight, a number-average particle diameter of 178 nm and a glass transition temperature of 5.1° C.

Determination of the Mechanical Properties a) Preparation of the Aqueous Polymer Compositions Based on the aqueous polymer dispersions of examples 1 to 5, roof skin formulations were prepared by mixing the constituents indicated in Table 1 (amounts in g) at room temperature in the order shown from top to bottom using a disk stirrer at 400 to 2500 rpm.

TABLE 1

| Roof skin formulation | F1 | F2 | F3 | F4 | F5 [6] |
|---|---|---|---|---|---|
| Dispersion/amount | 1/55 | 2/53 | 3/55 | 4/54 | 5/56 |
| Wetting agent [1] | 0.4 | 0.4 | 0.4 | 0.4 | 0.4 |
| Defoamer [2] | 0.5 | 0.5 | 0.5 | 0.5 | 0.5 |
| Dispersant [3] | 1.2 | 1.2 | 1.2 | 1.2 | 1.2 |
| Filler [4] | 42.5 | 42.5 | 42.5 | 42.5 | 42.5 |
| Thickener [5] | 0.35 | 0.35 | 0.65 | 0.35 | 0.3 |
| Defoamer [2] | 0.4 | 0.4 | 0.4 | 0.4 | 0.4 |

[1] Lutensol TO 82, BASF SE, Ludwigshafen
[2] Agitan 282, Münzing Chemie GmbH, Heilbronn
[3] Dispex CX 4320, BASF SE, Ludwigshafen
[4] Hydrocarb 95 ME, Omya, Oftringen, Switzerland
[5] Rheovis PU 1270, BASF SE, Ludwigshafen
[6] Comparative example After the addition of the last component, stirring was continued until everything was mixed homogeneously (about 10 min) and then the resulting roof skin formulation was added to a Speed Mixer DAC 400 FVZ from Hauschild and mixed for 0.5 min at 2000 rpm.

The roof skin formulation has a solids content of about 63-67%, a pigment volume concentration of about 29 and a viscosity of 8000-10000 mPas (Brookfield, spindle 6, 20 rpm).

b) Preparation of Coatings and Test Specimens

The aforesaid roof skin formulation was applied to a Teflon coated substrate with a doctors blade in a layer having a thickness of 1.2 mm. Subsequently, the thus obtained coatings were dried for 7 days at 23° C. and 50% relative humidity in a climatic chamber. The resulting dry film thickness is about 0.60 mm. After the coating had been peeled off from the substrate, the required test specimens were punched out with an appropriate punching iron.

c) Determination of Tensile Strength, Breaking Strength and Elongation at Break

From the above-described coatings, dumbbell test specimens of size S1 were punched out with the aid of a punching iron. The test was carried out in accordance with DIN 53504. The dumbbell test specimens are clamped in a tensile/strain testing machine from the company Zwick and subsequently pulled apart at a rate of 200 mm/min until tearing.

d) Determination of the Water Absorption

A piece of the coating of about 5*5 cm in size is stored for 24 hours under water; then the water on the surface is wiped off and the thus treated coating is weighed back. The difference in weight before and after the water storage corresponds to the water absorption of the coating.

TABLE 2

| Roof skin formulation | | 1 | 2 | 3 | 4 | 5 |
|---|---|---|---|---|---|---|
| Tensile strength | N/mm$^2$ | 3.0 | 4.74 | 5.0 | 4.18 | 2.4 |
| Elongation at break | % | 703 | 492 | 341 | 696 | 324 |
| Water absorption (24 h) | % | 23.8 | 20.0 | 14.9 | 11.8 | 23.5 |

The tested coatings according to the invention have large tensile strength of 3 to 5 N/mm$^2$ and simultaneously a large elongation at break of 341 to 703%. The water absorption of the coatings 2 to 5 is only 10 to 20%.

The invention claimed is:

1. A method for providing a flexible roof coating, the method comprising obtaining a liquid aqueous polymer composition comprising:
   a. an aqueous polymer latex, where a polymer in the aqueous polymer latex comprises ethylenically unsaturated monomers M, where the ethylenically unsaturated monomers M comprise a combination of
  i) at least two different monoethylenically unsaturated, non-ionic monomers M1, whose homopolymers have a theoretical glass transition temperature $T_g(th)$ of at least 25° C. and
  ii) at least two different monoethylenically unsaturated, non-ionic monomers M2, whose homopolymers have a theoretical glass transition temperature $T_g(th)$ of less than 25° C.,
  where each of the monomers M1 and M2 have a solubility in deionized water of at most 50 g/L and where a total amount of the monomers M1 and M2 contributes at least 90% by weight to a total amount of the monomers M, and
  where the aqueous polymer latex is prepared by free radical aqueous emulsion polymerization of the ethylenically unsaturated monomers M, which form the aqueous polymer latex, in the presence of at least one surfactant and at least one polymerization initiator and optionally in the presence of a seed latex, where an amount of seed latex, if present, is in a range from 0.1 to 10% by weight, calculated as solids and based on a total weight of the monomers M to be polymerized; and
b. at least one inorganic particulate material selected from inorganic pigments, inorganic fillers and mixtures thereof, wherein the liquid aqueous polymer composition has a pigment volume concentration (PVC) of from 15% to 50%,
and, wherein, when applying the liquid aqueous polymer composition to a surface of a substrate to be coated with an application rate of from 750 to 3,500 g/m² an average coating thickness of 450 to 2,000 μm, calculated on a dry film basis is achieved.

2. The method of claim 1, where the monomers M1 have a $T_g(th)$ of at least 50° C. and where the monomers M2 have a $T_g(th)$ of at most −20° C.

3. The method of claim 1, where the monomers M1 are a combination of:
  at least one monomer M1a, which is selected from vinylaromatic hydrocarbon monomers and $C_5$-$C_6$-cycloalkyl methacrylates; and
  at least one monomer M1b, which is selected from $C_1$-$C_4$-alkyl esters of methacrylic acid and tert-butyl acrylate.

4. The method of claim 1, where the monomers M1 comprise styrene, and where styrene contributes 10 to 35% by weight to the total amount of the monomers M.

5. The method of claim 3, where a weight ratio of the at least one monomer M1a to the at least one monomer M1b is from 3:1 to 1:3.

6. The method of claim 1, where a total amount of the monomers M1 contributes 25 to 70% by weight to the total amount of the monomers M.

7. The method of claim 1, where the monomers M2 are a combination of at least two different $C_2$-$C_{12}$-alkyl acrylates, except for tert-butyl acrylate.

8. The method of claim 1, where each of the monomers M2 contributes at least 10% by weight to the total weight of the monomers M, and where a total amount of the monomers M2 contributes 20 to 75% by weight to the total amount of the monomers M.

9. The method of claim 1, where the monomers M comprise at least one further monoethylenically unsaturated monomer, which is selected from the group consisting of:
  monomers M3, which are selected from the group consisting of monoethylenically unsaturated $C_3$-$C_6$-monocarboxylic acids, monoethylenically unsaturated $C_4$-$C_6$-dicarboxylic acids, primary amides of monoethylenically unsaturated $C_3$-$C_6$-monocarboxylic acids, and hydroxy-$C_2$-$C_4$-alkyl esters of monoethylenically unsaturated $C_3$-$C_6$-monocarboxylic acids and mixtures thereof,
  monomers M4, which are selected from the group consisting of monoethylenically unsaturated monomers having at least one keto group and monoethylenically unsaturated monomers having at least one oxirane group and mixtures thereof, and
  monomers M5, which are selected from the group consisting of monoethylenically unsaturated monomers having a silane group.

10. The method of claim 1, where the monomers M comprise
  from 25 to 70% by weight, based on a total weight of the monomers M, of a combination at least two monomers M1;
  from 20 to 75% by weight, based on the total weight of the monomers M, of a combination at least two monomers M2;
  from 0.1 to 10% by weight, based on the total weight of the monomers M, of one or more monoethylenically unsaturated monomers, selected from the group consisting of
  one or more monomers M3a in an amount of at most 5% by weight, based on the total amount of the monomers M, which are selected from the group consisting of monoethylenically unsaturated $C_3$-$C_6$-monocarboxylic acids and monoethylenically unsaturated $C_4$-$C_6$-dicarboxylic acids,
  one or more monomers M3b in an amount of at most 5% by weight, based on the total amount of the monomers M, which are selected from the group consisting of primary amides of monoethylenically unsaturated $C_3$-$C_6$-monocarboxylic acids, and hydroxy-$C_2$-$C_4$-alkyl esters of monoethylenically unsaturated $C_3$-$C_6$-monocarboxylic acids and mixtures thereof,
  one or more monomers M4 in an amount of at most 5% by weight, based on the total amount of the monomers M, which are selected from the group consisting of monoethylenically unsaturated monomers having at least one ketogroup and monoethylenically unsaturated monomers having at least one oxirane group and mixtures thereof, and
  one or more monomers M5 in an amount of at most 2% by weight, based on the total amount of the monomers M, which are selected from the group consisting of monoethylenically unsaturated monomers having a silane group.

11. The method of claim 1, where the polymer has a glass transition temperature $T_g$ in a range from −20° C. to +40° C., where the glass transition temperature is determined by differential scanning calorimetry using a heating rate of 20 K/min and applying a midpoint measurement in accordance with ISO 11357-2:2013-05.

12. The method of claim 1, where the liquid aqueous polymer composition comprises at least one inorganic filler selected from the group consisting of natural calcium carbonates, synthetic calcium carbonates, calcium silicates, aluminum silicates and alkalimetal silicates.

13. The method of claim 12, where the at least one inorganic filler comprises particles and at least 90% by weight of the particles of the at least one inorganic filler have a particle size in a range from 0.1 to 25 μm, as determined by laser diffraction in accordance with ISO 13320:2009.

14. The method of claim 13, where at least 50% by weight of the particles of the at least one inorganic filler have a particle size in a range from 0.1 to 2 μm, as determined by laser diffraction in accordance with ISO 13320:2009.

15. The method of claim 12, where the liquid aqueous polymer composition additionally comprises at least one inorganic white pigment.

16. The method of claim 1, where the pigment volume concentration PVC is in a range from 20 to 450.

17. A method for providing a flexible roofing, the method comprising applying the liquid aqueous polymer composition as defined in claim 1 as a coating to a flat roof having an inclination of not more than 15°.

* * * * *